(12) United States Patent
Yang et al.

(10) Patent No.: US 7,238,020 B2
(45) Date of Patent: Jul. 3, 2007

(54) DEVICE FOR CONTROLLING HYDROGEN FLOW OF HYDROGEN STORAGE CANISTER

(75) Inventors: Jefferson Y S Yang, Orange, CA (US); Yingjeng James Li, Taoyuan Hsien (TW)

(73) Assignee: Asia Pacific Fuel Cell Technologies, Ltd., Miaoli (TW)

(*) Notice: Subject to any disclaimer, the term of this patent is extended or adjusted under 35 U.S.C. 154(b) by 580 days.

(21) Appl. No.: 10/735,754

(22) Filed: Dec. 16, 2003

(65) Prior Publication Data

US 2004/0142222 A1 Jul. 22, 2004

(30) Foreign Application Priority Data

Jan. 21, 2003 (TW) .............................. 92201048 U

(51) Int. Cl.
*F23D 11/44* (2006.01)
(52) U.S. Cl. .................... 431/11; 431/161; 431/210; 431/24
(58) Field of Classification Search .............. 431/7, 431/210, 211, 207, 161, 328, 163, 164, 11; 422/129
See application file for complete search history.

(56) References Cited

U.S. PATENT DOCUMENTS

| | | | | | |
|---|---|---|---|---|---|
| 4,451,228 | A | * | 5/1984 | Wada et al. | 431/76 |
| 4,773,847 | A | * | 9/1988 | Shukla et al. | 431/46 |
| 5,149,260 | A | * | 9/1992 | Foust | 431/11 |
| 6,630,648 | B2 | * | 10/2003 | Gruenwald | 219/385 |
| 6,887,603 | B2 | * | 5/2005 | Kasahara et al. | 429/17 |
| 6,908,301 | B2 | * | 6/2005 | Yamaguchi et al. | 431/75 |
| 2004/0058809 | A1 | * | 3/2004 | Rei et al. | 502/200 |

* cited by examiner

*Primary Examiner*—Kenneth Rinehart
*Assistant Examiner*—Chuka C Ndubizu
(74) *Attorney, Agent, or Firm*—Rosenberg, Klein & Lee

(57) ABSTRACT

A control device for controlling hydrogen flow of a hydrogen storage canister accommodated in a canister containing chamber includes a heating device which is connected to a heating fuel storage tank via a heating fuel supplying pipeline for conveying a heating fuel to a catalyst bed in the canister containing chamber and generating heat by combustion of the heating fuel at the catalyst bed. A blowing device provides an air flow to the canister containing chamber. A controller controls the operation of the heating device and the blowing device in correspondence to a temperature signal detected from an internal space of the canister containing chamber. The controller is coupled with a setting unit for setting various parameters which are stored in a parameter storage unit for controlling the controller.

13 Claims, 3 Drawing Sheets

DEVICE FOR CONTROLLING HYDROGEN FLOW OF HYDROGEN STORAGE CANISTER

BACKGROUND OF THE INVENTION

1. Field of the Invention

The present invention relates generally to a control device for hydrogen storage, and more particularly to a device for controlling a hydrogen flow of a hydrogen storage canister accommodated in a canister containing chamber incorporated with a catalyst bed therein.

2. Description of the Prior Art

A fuel cell system is a power-generating unit that generates electrical power energy through electrochemical reaction of hydrogen and oxygen. To perform electrochemical reaction, hydrogen gas and air are separately conveyed to the fuel cell system via hydrogen gas passage and air passage.

Currently, a variety of ways are available for storage of hydrogen. Hydrogen can be stored in compressed gas form as compressing hydrogen, in liquid state as liquid hydrogen or in hydride form as metal hydride. Although compressed hydrogen has high gravimetric density of hydrogen, compressing hydrogen is an expensive process and the compressed hydrogen gas still occupies a great amount of space. In addition, the high pressure of compressed hydrogen is adverse to operation safety. Similarly, liquid hydrogen has high density. However, liquidization of hydrogen is a high energy consumption process. Moreover, because liquid hydrogen must be stored in a heat insulating storage tank, it is more economical and suitable to use liquid hydrogen in a system with a large storage tank. In most applications, hydride form is the most feasible way for storing hydrogen economically. An example is the compact hydrogen storage of electrical vehicle.

Metal hydride is formed by metallic material commonly referred to as hydrogen storage alloy which is capable to adsorb and desorb hydrogen. There are a variety of metal hydrides used. The charging/discharging pressure and temperature depend on the kind of metal hydride. Also, the hydrogen storage capacity of metal hydride, i.e. the weight or volume of hydrogen that a unit weight of metal hydride can adsorb, varies from kind to kind. The conventional metal hydrides include lanthanum-nickel alloy (LaNi), iron-titanium alloy (FeTi) and magnesium (Mg) alloy, among which iron-titanium alloy is most commonly used. Some properties of iron-titanium alloy, including the hydrogen pressure, hydrogen flux and unit weight, make the iron-titanium alloy comparatively more suitable to be used in, for example, electrical vehicle than others.

The hydrogen storage capacity of magnesium alloy is larger than that of lanthanum-nickel alloy or iron-titanium alloy. In other words, for the same unit weight of alloy, magnesium alloy can store a larger amount of hydrogen than lanthanum-nickel alloy or iron-titanium alloy. However, magnesium alloy possesses a defect in practical use. Magnesium alloy is able to release a high flux of hydrogen only when the temperature is high enough e.g. at 200~300° C. Therefore, it is not appropriate and inefficient to use magnesium alloy in a system that does not comprise a powerful heating device to heat up the magnesium alloy.

Generally, it is convenient and safe to use hydrogen storage alloy for storage of hydrogen in a fuel cell system. However, it should be noted that the ability of the hydrogen storage alloy to charge and discharge hydrogen directly affects the performance of the fuel cell system. Desorption of hydrogen is an endothermic process, and therefore, during discharging, the hydrogen storage alloy absorbs heat and causes a drop in temperature. The decrease of temperature in turn slows down the release of hydrogen from the hydrogen storage alloy. Therefore, in order to keep a steady performance of the fuel cell system, it is required to control the hydrogen flow from the hydrogen storage alloy by a proper control mode. In addition, it is needed to have a control device to monitor the statuses and control the operations of various components in the fuel cell system.

To maintain a steady discharging rate, heat is sufficiently and continuously provided to the hydrogen storage alloy. The conventional techniques for heating up the hydrogen storage alloy to discharge hydrogen include heating by an electrical heater or by the heat waste recirculated from the engine or the fuel cell system. In that cases, the fuel cell system is either equipped with a power supply for powering the electrical heater, or alternatively, with a heat waste re-circulator for utilizing of the heat waste. Both of the techniques are limited to use in some applications. Practically, the use of the electrical heater consumes a substantial amount of power and raises the operation cost. Besides, the heating rate is not fast enough. The heating devices currently available are not capable to heat up rapidly to a high temperature. On the other hand, the temperature of the heat waste from the proton exchange membrane fuel cell system is usually below 100° C. which is not hot enough for heating up the magnesium alloy based hydrogen storage alloy.

Moreover, for a fuel cell system that includes a heating device for heating the hydrogen storage alloy, it is superior for the fuel cell system to be further equipped with a control device to moderately monitor the statuses and control the normal operation of components.

SUMMARY OF THE INVENTION

Thus, a primary object of the present invention is to provide a control device for controlling hydrogen flow from hydrogen storage canisters. By means of the control device, the release of hydrogen from the hydrogen storage canister at discharging can be moderately controlled.

Another object of the present invention is to provide a heating device with high performance for hydrogen storage canisters. The heating device generates heat by combustion of methanol in a catalyst bed, such that the hydrogen storage canisters can be heated efficiently in short time, and the discharging rate of hydrogen from the hydrogen storage canisters can be regulated.

To achieve the above objects, in accordance with the present invention, there is provided a device for controlling hydrogen flow of hydrogen storage canisters by regulating the temperature of the hydrogen storage canisters. The control device comprises a heating device which is connected to a heating fuel storage tank via a heating fuel supplying pipeline for conveying a heating fuel to a catalyst bed in the canister containing chamber and generating heat by combustion of the heating fuel at the catalyst bed. A blowing device provides an air flow to the canister containing chamber. A controller controls the operation of the heating device and the blowing device in correspondence to a temperature signal detected from an internal space of the canister containing chamber. The controller is coupled with a setting unit for inputting various parameters for controlling the controller and a parameter storage unit for storing the parameters.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
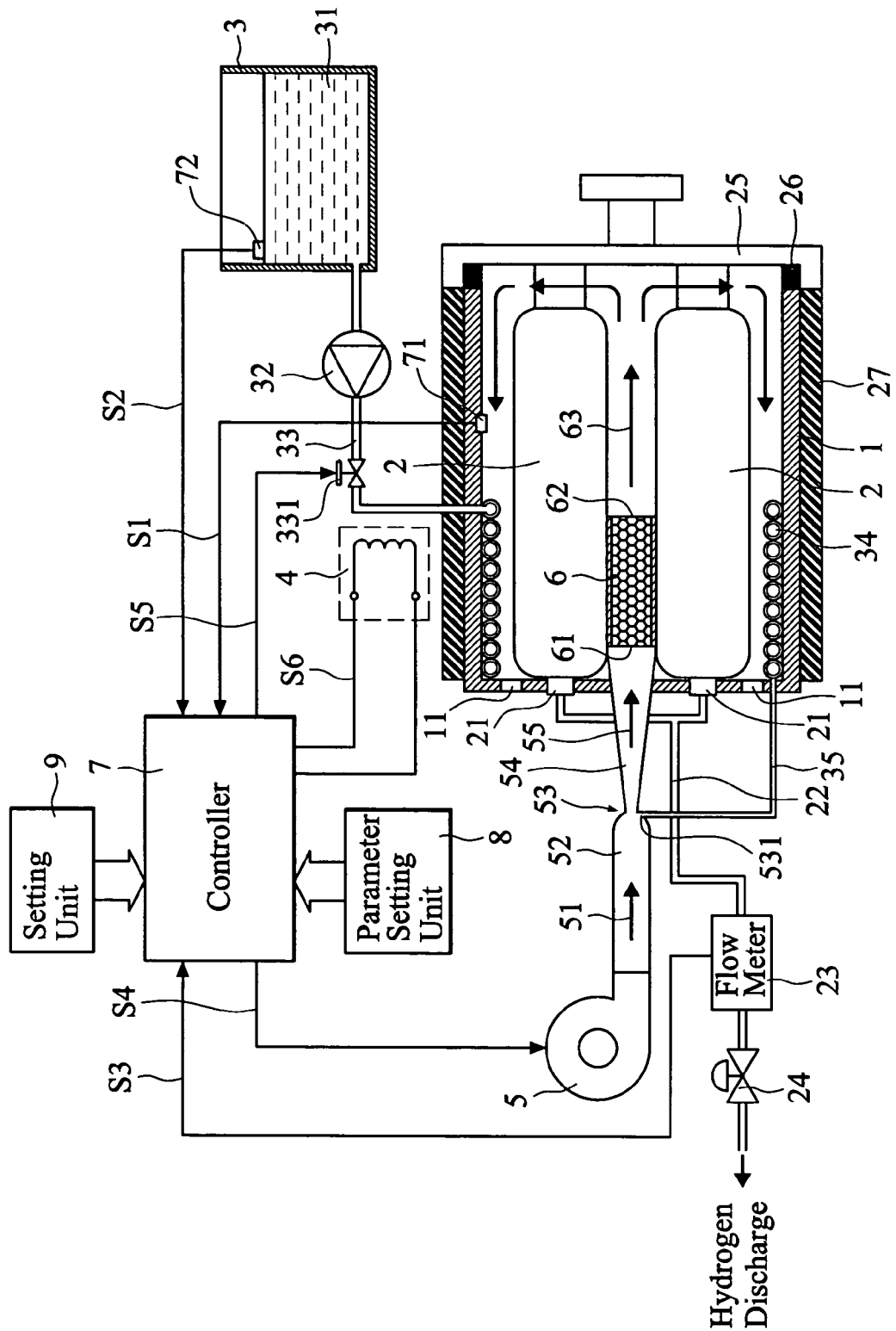
FIG. 1 is a schematic view showing an arrangement of a control device for controlling hydrogen flow of hydrogen storage canisters in accordance with a preferred embodiment of the present invention.

With reference to the drawings and in particular to FIG. 1, a control device for controlling hydrogen flow of hydrogen storage canisters in accordance with a preferred embodiment of the present invention is shown. The control device comprises a canister containing chamber 1 that is formed with an internal space for accommodation of e.g. two hydrogen storage canisters 2 therein. Each hydrogen storage canisters 2 is coupled to one end of a hydrogen supplying pipeline 22 by means of a connecting member 21. The connecting member 21 secures the connection between the hydrogen storage canister 2 and the hydrogen supplying pipeline 22 by means of conventional linkage such as engagement, fastening, screwing or pressing.

The hydrogen supplying pipeline 22 comprises a flow meter 23 for measuring a flow rate of hydrogen discharging from the hydrogen storage canisters 2, and a pressure regulating valve 24 for regulating the pressure of hydrogen released from the hydrogen supplying pipeline 22.

The other end of the canister containing chamber 1 is covered by a cover 25 to form a closed end. When hydrogen in any hydrogen storage canister 2 is used up, the cover 25 is removed such that the hydrogen storage canister 2 can be dismounted and taken out from the canister containing chamber 1 and replaced with a new hydrogen storage canister 2. A packing ring 26 is sandwiched between the cover 25 and the canister containing chamber 1. Moreover, a heat insulating layer 27 may be formed on the outer surface of the canister containing chamber 1 to keep the temperature of the canister containing chamber 1.

The heating device also comprises a heating fuel storage tank 3 for storage of a heating fuel 31 such as methanol. The heating fuel 31 is supplied to a heating fuel supplying pipeline 33 by a pump 32. A coiled pipe 34 winds around an inner surface of the canister containing chamber 1. One end of the coiled pipe 34 is connected to the heating fuel supplying pipeline 33 for conveying the heating fuel 31 therefrom.

Preferably, the heating fuel supplying pipeline 33 is equipped with a pre-heating device 4 at a section preceding the canister containing chamber 1. The pre-heating device 4 may be an electrical heater. By means of the pre-heating device 4, the heating fuel 31 supplied by the heating fuel storage tank 3 is pre-heated when it flows through the heating fuel supplying pipeline 33 to the coiled pipe 34.

Also, the heating device 1 comprises a blowing device 5 for supplying an air flow 51. An outflow end of the blowing device 5 is connected to an inflow end of a nozzle section 53 via an air flow leading pipe 52 to convey the air flow 51 to the nozzle section 53. Then, the air flow 51 sprays out from an outflow end of the nozzle section 53 to a heating gas drawing pipe 54 which is communicated with a heating gas inflow end 61 of a catalyst bed 6. The catalyst bed 6 is arranged in the internal space of the canister containing chamber 1. In the embodiment, the catalyst bed 6 is disposed between two hydrogen storage canisters 2.

The nozzle section 53 is also connected with a heating fuel inlet 531 which is communicated with a heating fuel supplying conduit 35. The heating fuel supplying conduit 35 is connected with the coiled pipe 34 connecting to the heating fuel pipeline 33.

Because the dimension of the passage of the nozzle section 53 is smaller than that of the air flow leading pipe 52, when air flow 51 flows from the air flow leading pipe 52 to the nozzle section, it has a pressure drop at the nozzle section 53. In other words, the nozzle section 53 has a lower pressure. Thereby, the heating fuel 31 in the heating fuel supplying conduit 35 is sucked to the nozzle section 53. Subsequently, the heating fuel 31 is mixed with the air flow and atomized to form a heating gas 55.

The heating gas 55 is conveyed through the heating gas drawing pipe 54 to the heating gas inflow end 61 of the catalyst bed 6. The heating gas 55, which comprises the heating fuel and air, is catalyzed by the catalyst bed 6 to combust and generate a hot gas 63 that flows around the internal space of the canister containing chamber 1. The canister containing chamber 1 is provided with at least one through hole 11 serving as a hot gas guiding outlet for the hot gas 63. Thereby, the hydrogen storage canisters 2 contained in the canister containing chamber 1 is heated. Moreover, when the hot gas 63 flows through the gap between the hydrogen storage canisters 2 and the inner surface of the canister containing chamber 1, it heats up the heating fuel 31 in the coiled pipe 34. Accordingly, the heating fuel 31 such as methanol is completely vaporized in the coiled pipe 34.

The canister containing chamber 1 may also comprise a hot gas re-circulating device either for reuse of the hot gas that contains incompletely burnt fraction or for utilization of heat waste. Moreover, the canister containing chamber 1 may further comprise an exhausted gas processing device for processing the hot gas that contains incompletely burnt substances. The exhausted gas processing device is similar to the catalyst converter of vehicle and able to reduce pollution.

The operations of the various components mentioned are controlled by a controller 7. The controller 7 is connected with a parameter storage unit 8 for storage of various parameters and a setting unit 9 for inputting of the parameters.

Figure 2:
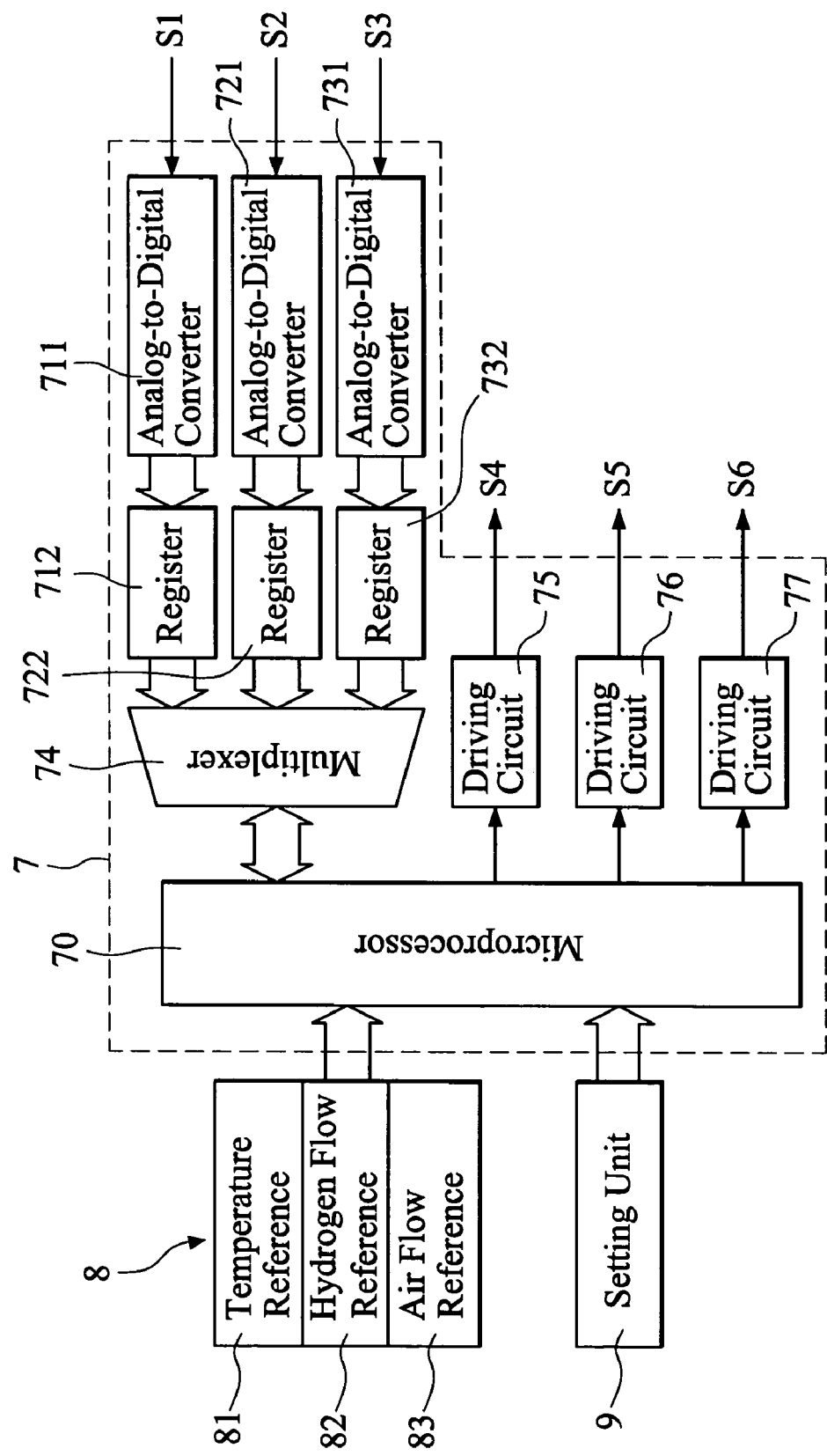
FIG. 2 is a circuit block diagram of the control device of FIG. 1.

FIG. 2 is a circuit block diagram of the controller. The controller is described with reference to FIGS. 1 and 2 below.

The controller 7 is coupled with a temperature sensor 71 which is mounted in the canister containing chamber 1 for detecting an internal temperature of the canister containing chamber 1. The temperature sensor 71 generates a temperature signal S1 to the controller 7. The temperature signal S1 is transmitted via an analog-to-digital converter 711 and a register 712 to a multiplexer 74 which forwards the temperature signal S1 to a microprocessor 70.

The controller 7 is also coupled to a heating fuel level detector 72 which is disposed at the heating fuel storage tank 3 for detecting a stock of the heating fuel 31 such as methanol and generating a heating fuel stock signal S2. The heating fuel stock signal S2 is transmitted via an analog-to-digital converter 721 and a register 722 to the multiplexer 74 which forwards the heating fuel stock signal S2 to the microprocessor 70.

Moreover, the controller 7 is coupled to the flow meter 23 in the hydrogen supplying pipeline 22 for receiving a hydrogen flow signal S3 from the flow meter 23. The hydrogen flow signal S3 is transmitted via an analog-to-digital converter 731 and a register 732 to the multiplexer 74 which forwards the heating fuel flow signal S3 to the microprocessor 70.

The controller 7 comprises a plurality of driving circuits 75, 76, 77. The microprocessor 70 of the controller 7 transmits an air flow control signal S4 via the driving circuit 75 to the blowing device 5 for controlling the air flow of the blowing device 5.

In addition, the microprocessor 70 transmits a heating fuel supply signal S5 via the driving circuit 76 to a control valve 331 mounting to the heating fuel supplying pipeline 33. The control valve 331 is driven to supply of heating fuel 31 by the microprocessor 70. Preferably, the control valve 331 is a proportion integral derivative valve (PID) which may be operated in a proportional operation mode and is able to control the flow of the heating fuel 31 precisely.

The microprocessor 70 also transmits a pre-heating control signal S6 via the driving circuit 77 to control the pre-heating of the heating fuel 31 by the pre-heating device 4. By means of the heating device 4, the heating fuel 31 in the heating fuel supplying pipeline 33 is heated by the heating device 4 before flowing to the coiled pipe 34.

The parameter setting unit 9 is coupled to the microprocessor 70 of the controller 7 for providing various parameters for controlling. The parameters include for example a temperature reference 81, a hydrogen flow reference 82, an air flow reference 83 and so on. The setting unit 9 is coupled to the microprocessor 70 for setting of various parameters for storage in the parameter storage unit 8.

The controller 7 controls the temperature of the hydrogen storage canisters 2 by heating or cooling the hydrogen storage canisters 2 in accordance with the operation requirements. Take for an example. When it is needed to cool the hydrogen storage canisters 2, the controller 7 drives the blowing device 5 to generate the air flow 51 and supply it to the internal space of the canister containing chamber 1 through the air flow leading pipe 52, the nozzle section 52 and the heating gas drawing pipe 54 in sequence.

When it is needed to heat the hydrogen storage canisters 2, the controller 7 drives the blowing device 4 to generate and supply the air flow 51 through the air flow leading pipe 52 to the nozzle section 53. Meanwhile, the pump 32 draws the heating fuel 31 from the heating fuel storage tank 3 to the heating fuel supplying pipeline 33. The heating fuel 31 is pre-heated by the pre-heating device 4 when flowing through the heating fuel supplying pipeline 33.

Subsequently, the heating fuel 31 is conveyed through the coiled pipe 34 and the heating fuel supplying conduit 35 to the heating fuel inlet 531 at the nozzle section 53. The heating fuel 31 is heated by the hot gas 63 from the catalyst bed 6 when the heating fuel 31 is conveyed through the coiled pipe 34.

As the air flow 51 passes through the nozzle section 53, it sucks in the heating fuel 31 from the heating fuel inlet 531 to the nozzle section 53, forming the atomized heating gas 55 that flows through the heating gas drawing pipe 54 to the catalyst bed 6. The heating gas 55 is combusted in the catalyst bed 6 and generates the hot gas 63.

Finally, the hot gas 63 is guided to flow around the internal space of the canister containing chamber 1 and heat the hydrogen storage canisters 2. As mentioned, the exhausted hot gas may be recirculated by means of a hot gas recirculating device to reuse the incompletely burnt fraction or to utilize the heat waste. The hot gas recirculating device resembles the catalyst converter of vehicle and is able to reduce pollution.

Figure 3:
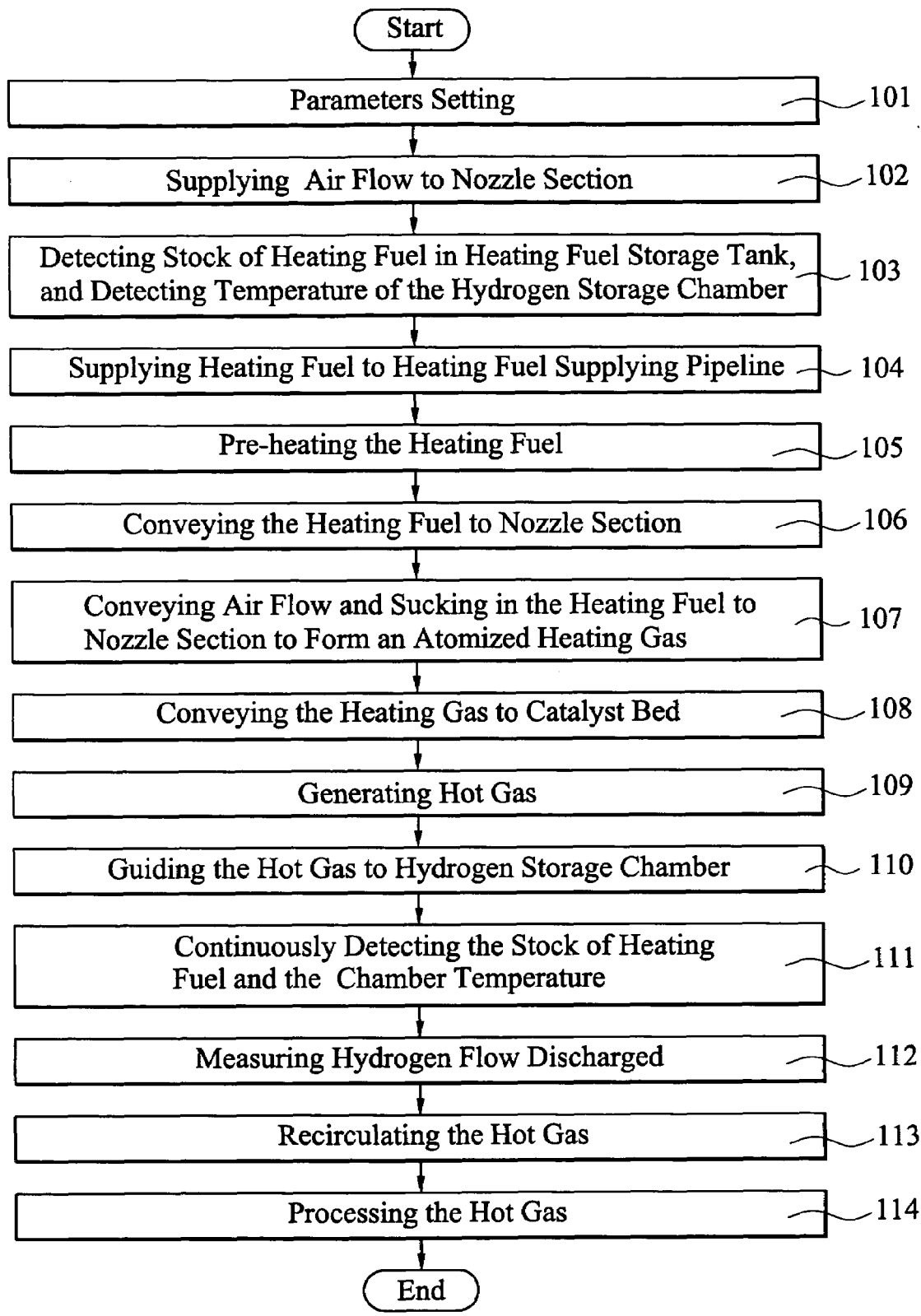
FIG. 3 is a flowchart of the present invention.

Please refer to FIG. 3 which is a flowchart of the present invention. Firstly, various control parameters are set in step 101. In step 102, air is drawn in by the blowing device 5 to generate an air flow 51 which is conveyed to the nozzle section 53 via the air flow leading pipe 52.

Meanwhile, the controller 7 detects the stock of the heating fuel 31 in the heating fuel storage tank 3 and also the internal temperature of the canister containing chamber 1 in step 103. If the stock of heating fuel 31 in the heating fuel storage tank 3 is normal, the controller 7 would drive the control valve 331 to operate, and the pump 32 draws the heating fuel 31 from the heating fuel storage tank 3 into the heating fuel supplying pipeline 33 in step 104.

In step 105, the pre-heating device 33 is driven to heat the heating fuel 31 flowing through the heating fuel supplying pipeline 33.

Then, the heating fuel 31 is conveyed through the coiled pipe 34 and the heating fuel supplying conduit 35 to the heating fuel inlet 531 at the nozzle section 53 in step 106.

The air flow 51 flows through the nozzle section 53 and sucks in the heating fuel 31 from the heating fuel inlet 531 to the nozzle section 53, forming the atomized heating gas 55 in step 107. The heating gas 55 is conveyed to the catalyst bed 6 in step 108 and combusted therein to generate the hot gas 63 in step 109.

Subsequently, the hot gas 63 is guided to flow around the internal space of the canister containing chamber 1 and heats up the hydrogen storage canisters 2 in step 110. At the same time, the controller 7 continuously detects the stock of heating fuel 31 in the heating fuel storage tank 3 and the internal temperature of the canister containing chamber 1 in step 111 so as to regulate the hydrogen flow from the hydrogen storage canisters 2. In step 112, the controller 7 measures the hydrogen flow in the hydrogen supplying pipeline 22 from the hydrogen storage canisters 2 by the flow meter 23.

In step 113, the hot gas 63 is exhausted and re-circulated by a hot gas re-circulating device such that the incompletely burnt fraction in the hot gas is reused. Of course, the hot gas may be further processed by an exhausted gas processing device to eliminate the incompletely burnt substances in the hot gas in step 114.

From the described embodiment, it is noted that the device and method for heating the hydrogen storage canisters are novel and very practical. Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A control device for controlling a hydrogen flow from at least one hydrogen storage canister accommodated in a canister containing chamber, comprising:

a heating device, which is supplied with a heating fuel by a heating fuel supplying pipeline in communication with a heating fuel storage tank for heating up the canister containing chamber, said heating device including a coiled pipe disposed adjacent to the at least one hydrogen storage canister on an inner surface of said canister containing chamber;

a blowing device, for providing an air flow via an air flow leading pipe to the canister containing chamber;

at least one temperature sensor, for detecting an internal temperature of the canister containing chamber and generating a temperature signal; and a controller with a microprocessor for controlling the heating device and the blowing device in correspondence to the temperature signal generated by the temperature sensor, and thereby controlling the hydrogen flow discharged from the hydrogen storage canisters via a hydrogen supplying pipeline.

2. The control device as claimed in claim 1, wherein the microprocessor is further coupled with a parameter storage unit for storage of at least one parameter.

3. The control device as claimed in claim 2, wherein the parameters stored in the parameter storage unit comprises a temperature reference, a hydrogen flow reference and an air flow reference.

4. The control device as claimed in claim 1, wherein the microprocessor is further coupled with a setting unit for setting at least one parameter to be stored in the parameter storage unit.

5. The control device as claimed in claim 1, further comprising a pre-heating device for pre-heating the heating fuel in the heating fuel supplying pipeline.

6. The control device as claimed in claim 1, further comprising a heating fuel level detector for detecting a stock of the heating fuel in the heating fuel storage tank and generating a heating fuel stock signal to the microprocessor.

7. The control device as claimed in claim 1, wherein the heating fuel is methanol.

8. The control device as claimed in claim 1, wherein the heating fuel supplying pipeline further comprises a control valve which is driven by the microprocessor to regulate the heating fuel supplied to the heating device.

9. The control device as claimed in claim 8, wherein the control valve is a proportion integral derivative valve.

10. The control device as claimed in claim 1, wherein the hydrogen supplying pipeline further comprises a flow meter for detecting the hydrogen flow of the hydrogen flowing in the hydrogen supplying pipeline.

11. The control device as claimed in claim 1, wherein the microprocessor transmits an air flow control signal via a driving circuit to the blowing device for controlling the air flow.

12. The control device as claimed in claim 1, wherein the heating device comprises:

a catalyst bed, arranging in the inner space of the canister containing chamber, having a heating gas inflow end and a heating gas outflow end; and a nozzle section, which has an inflow end in communication with the air flow leading pipe for conveying the air flow into the nozzle section, an outflow end in communication with a heating gas drawing pipe connecting to the heating gas inflow end of the catalyst bed, and a heating fuel inlet connecting to the heating fuel supplying pipeline;

wherein when the air flow flows through the nozzle section, the heating fuel in the heating fuel supplying pipeline is sucked into the nozzle section to mix with the air flow forming an atomized heating gas, the atomized heating gas being further supplied via the heating gas drawing pipe to the catalyst bed to generate a hot gas, so that the hydrogen storage canister contained in the canister containing chamber is heated to discharge hydrogen.

13. The control device as claimed in claim 12, wherein one end of the coiled pipe being connected to the heating fuel supplying pipeline and the other end being connecting to a heating fuel inlet at the nozzle section, such that the heating fuel is conveyed from the heating fuel supplying pipeline via the coiled pipe and the nozzle section to the catalyst bed where the heating fuel is combusted to generate a hot gas for heating the heating fuel in the coiled pipe.

* * * * *